US008711186B2

(12) United States Patent
Champion

(10) Patent No.: US 8,711,186 B2
(45) Date of Patent: Apr. 29, 2014

(54) SCANNING PROJECTION APPARATUS WITH TANGENTIAL COMPENSATION

(75) Inventor: Mark Champion, Kenmore, WA (US)

(73) Assignee: Microvision, Inc., Redmond, WA (US)

( * ) Notice: Subject to any disclaimer, the term of this patent is extended or adjusted under 35 U.S.C. 154(b) by 576 days.

(21) Appl. No.: 13/099,209

(22) Filed: May 2, 2011

(65) Prior Publication Data

US 2012/0281024 A1    Nov. 8, 2012

(51) Int. Cl.
    *G09G 5/10* (2006.01)
(52) U.S. Cl.
    USPC ...................................................... 345/690
(58) Field of Classification Search
    CPC ........... G09G 3/02; G09G 3/025; G09G 3/34; G09G 3/346; G09G 5/10; G02B 26/10; G02B 27/0031
    USPC ................. 345/156, 157, 419–429, 633, 690; 359/213.1, 676, 660, 823, 827; 250/236; 355/53–67
    See application file for complete search history.

(56) References Cited

U.S. PATENT DOCUMENTS

| 4,155,620 | A | * | 5/1979 | Rawson | 359/215.1 |
| 4,436,383 | A | * | 3/1984 | Maeda | 359/662 |
| 4,764,672 | A | * | 8/1988 | Wu et al. | 250/236 |
| 4,838,632 | A | * | 6/1989 | Manian | 359/221.1 |
| 5,046,852 | A | * | 9/1991 | Hametner et al. | 356/398 |
| 5,525,764 | A | * | 6/1996 | Junkins et al. | 178/18.01 |
| 5,694,180 | A | * | 12/1997 | Deter et al. | 348/746 |
| 7,304,717 | B2 | * | 12/2007 | Hummel et al. | 355/53 |
| 8,265,422 | B1 | * | 9/2012 | Jin | 382/275 |
| 2004/0004585 | A1 | * | 1/2004 | Brown et al. | 345/32 |
| 2004/0075624 | A1 | * | 4/2004 | Tegreene et al. | 345/7 |
| 2004/0076340 | A1 | * | 4/2004 | Nielsen | 382/284 |
| 2005/0117215 | A1 | * | 6/2005 | Lange | 359/462 |
| 2006/0001940 | A1 | * | 1/2006 | Turner et al. | 359/224 |
| 2006/0232846 | A1 | * | 10/2006 | Himmer et al. | 359/224 |
| 2006/0274302 | A1 | * | 12/2006 | Shylanski et al. | 356/139.09 |
| 2007/0035706 | A1 | * | 2/2007 | Margulis | 353/122 |
| 2007/0035798 | A1 | * | 2/2007 | Oettinger | 359/213 |
| 2007/0291051 | A1 | * | 12/2007 | Brown et al. | 345/647 |
| 2010/0045700 | A1 | * | 2/2010 | Lefevre et al. | 345/633 |
| 2010/0085423 | A1 | * | 4/2010 | Lange | 348/46 |
| 2011/0050859 | A1 | * | 3/2011 | Kimmel et al. | 348/50 |
| 2011/0211036 | A1 | * | 9/2011 | Tran | 348/14.08 |

* cited by examiner

*Primary Examiner* — Prabodh M Dharia
(74) *Attorney, Agent, or Firm* — Kevin D. Wills

(57) ABSTRACT

A scanning projector includes a scanning mirror that sweep a beam in two dimensions. Tangential distortion in a fast-scan dimension is compensated by incorporating a tangent function when determining the light beam location and interpolating pixel data. Tangential distortion in a slow-scan dimension is compensated by driving the scanning mirror nonlinearly in the slow scan dimension such that the light beam sweeps across the display surface at a constant rate.

6 Claims, 12 Drawing Sheets

TOP VIEW

SIDE VIEW

SCANNING PROJECTION APPARATUS WITH TANGENTIAL COMPENSATION

FIELD

The present invention relates generally to projection systems, and more specifically to scanning projection systems.

BACKGROUND

Scanning displays that display an image on a flat display surface may suffer from multiple types of spatial distortion. One type is sinusoidal distortion that occurs when a mirror scans in a sinusoidal manner. Another type of distortion is tangential distortion. Tangential distortion occurs when displaying an image on a flat display surface and becomes more significant with larger scan angles. Tangential distortion affects both horizontal and vertical axes regardless of whether the mirror is scanned sinusoidally, linearly, or otherwise. Tangential distortion is manifested by an image being stretched around the edges where the scan angle is the largest.

DESCRIPTION OF EMBODIMENTS

Figure 1:
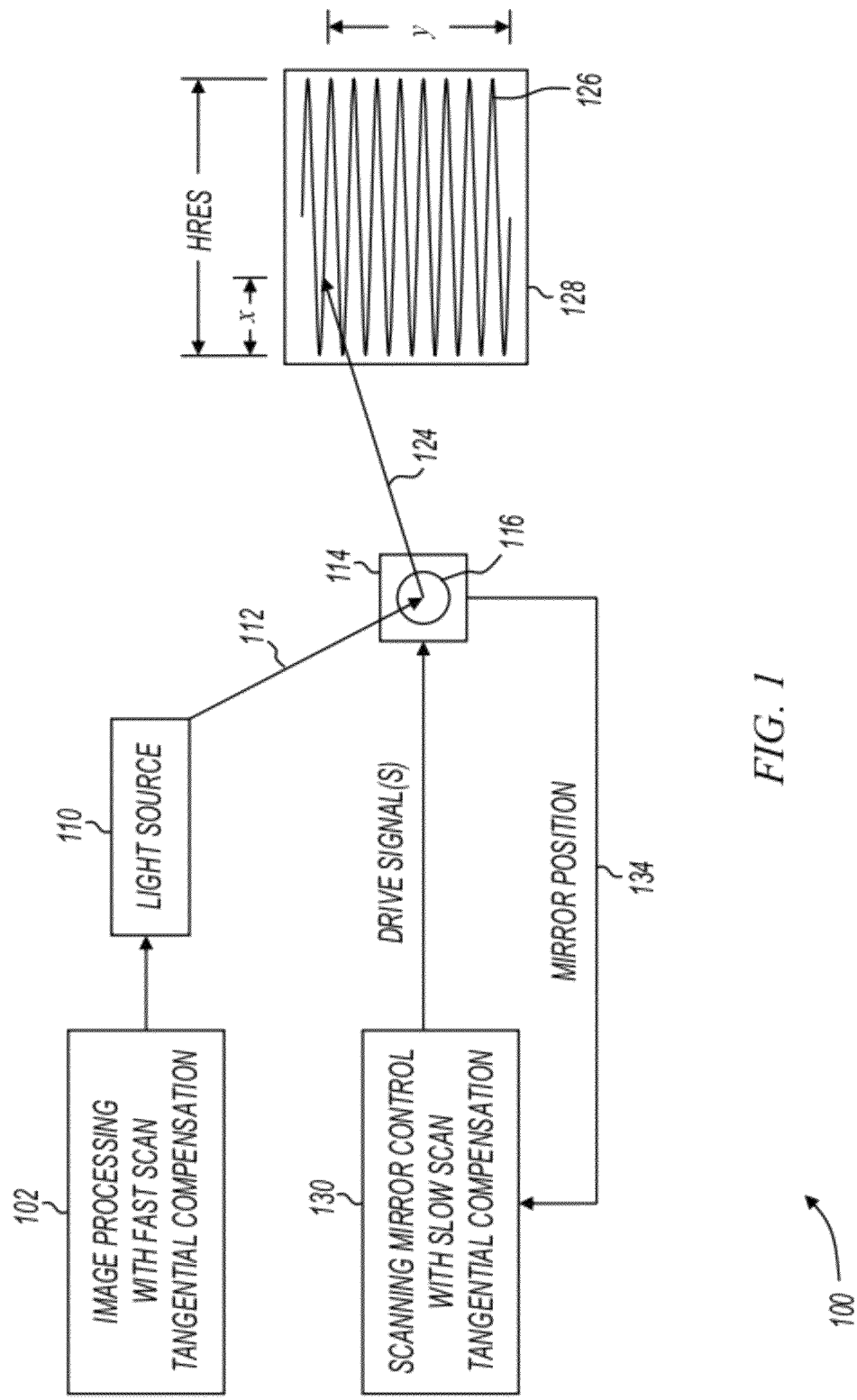
FIG. 1 shows a scanning projection apparatus in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning projection apparatus in accordance with various embodiments of the present invention. As shown in FIG. 1, scanned beam projection system 100 includes a light source 110, which may be a laser light source such as a laser diode or the like, capable of emitting a beam 112 which may be a laser beam. The beam 112 impinges on a scanning platform 114 which includes a microelectromechanical system (MEMS) based scanner or the like, and reflects off of scanning mirror 116 to generate a controlled output beam 124. A scanning mirror control circuit 130 provides one or more drive signal(s) to control the angular motion of scanning mirror 116 to cause output beam 124 to generate a raster scan 126 on a projection surface 128.

In some embodiments, raster scan 126 is formed by combining a sinusoidal component on the fast-scan axis (horizontal axis) and a sawtooth component on the slow-scan axis (vertical axis). In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the fast-scan sinusoidal pattern as the beam sweeps vertically top-to-bottom, but does not show the flyback from bottom-to-top.

Although the fast-scan axis is shown as the horizontal axis, and the slow-scan axis is shown as the vertical axis, the various embodiments of the present invention are not so limited. In some embodiments, the slow-scan axis is the horizontal axis and the fast scan axis is the vertical axis.

Scanning mirror 116 is deflected according to signals provided by scanning mirror control circuit 130, and mirror position information is provided back to scanning mirror control circuit 130 at 134. The mirror position information may describe angular position in the vertical slow-scan direction, the horizontal fast-scan direction, or both. Scanning mirror control circuit 130 receives the position information, determines the appropriate drive signals, and drives scanning mirror 116.

Scanning mirror control circuit 130 provides compensation for tangential distortion in the slow-scan dimension. For example, in some embodiments, the drive signals provided by scanning mirror control circuit 130 result in scanning mirror 116 moving at a nonlinear rate in the vertical dimension in such a manner that the output beam 124 sweeps vertically across the flat projection surface at a substantially linear rate.

Image processing circuit 102 provides compensation for tangential distortion in the fast-scan dimension by modifying the location of displayed pixels such that the displayed image is not stretched for large scan angles. In some embodiments, image processing circuit 102 includes an interpolator that interpolates source image pixel data to arrive at display pixel data, and the tangential compensation is provided by modifying the computed location of the scanned beam relative to the pixels in the source image.

As shown in FIG. 1, the displayed image has a horizontal resolution (HRES). HRES is shown as encompassing the entire width of the scan trajectory, although this is not a limitation of the present invention. For example, in some embodiments, the far left and far right portions of the scan trajectory may include overscan regions in which no image data is displayed, and HRES may encompass less than all of the scan trajectory width.

The current location of the scanned beam on the display surface is shown as (x,y), where x is the horizontal location and y is the vertical location. In various embodiments of the invention, tangential distortion in the slow-scan (vertical) dimension is compensated by modifying mirror movement on the slow-scan axis such that y actually changes linearly with time. In further embodiments, tangential distortion in the fast-scan (horizontal) dimension is compensated by modifying the computed horizontal location of the beam (x) when interpolating data in the source image. These embodiments and others are more fully described below with reference to later figures.

Figure 2:
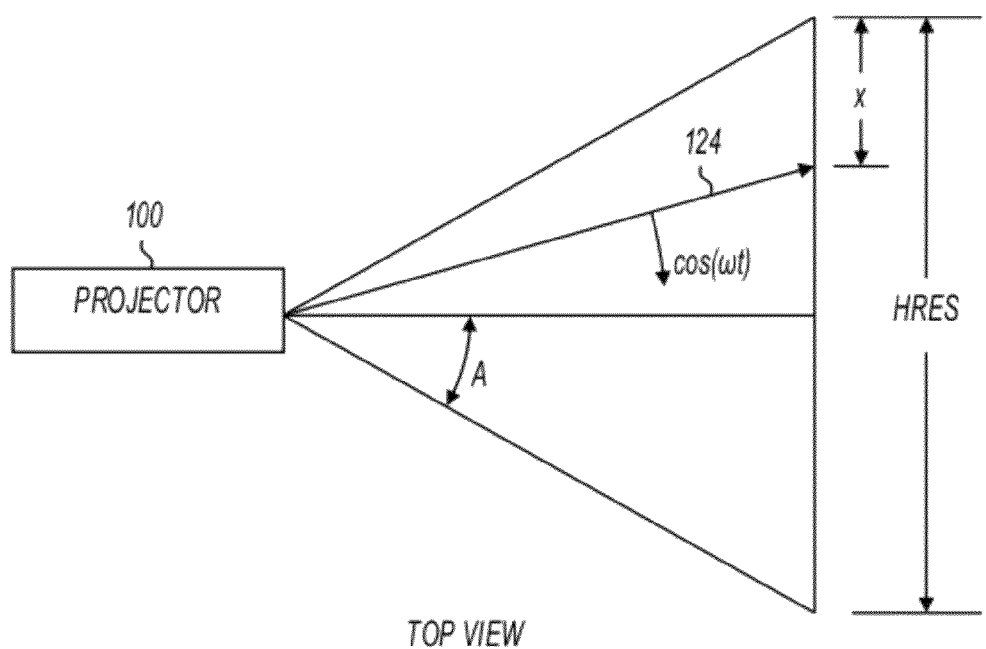
FIG. 2 shows a top view of the scanning projection apparatus with a light beam scanning in a fast-scan dimension.

FIG. 2 shows a top view of the scanning projection apparatus with a light beam scanning in a fast-scan dimension. Scanning projection apparatus 100 is shown sweeping light beam 124 in the horizontal dimension (vertically in the figure) at a rate of $\cos(\omega t)$, where $\omega$ is the oscillation frequency of the mirror, t is time, and $\omega t$ is the phase of the oscillating scanning mirror.

Sinusoidal distortion in the fast-scan dimension may be compensated by evaluating the horizontal position x as:

$$x = \frac{HRES}{2}\sin(\omega t) + \frac{HRES}{2} \quad (1)$$

The resulting x represents the horizontal address of the pixel to be displayed at time t. When projecting on a flat surface, equation (1) is only approximate because it does not account for tangential distortion. The result appears as a nonlinearity in the computation of x.

Various embodiments of the present invention utilize a modified form of equation (1) to compensate for tangential distortion in the fast-scan dimension. For example, sinusoidal and tangential distortion in the fast-scan dimension may be compensated by evaluating the horizontal position x as:

$$x = \frac{HRES}{2}\frac{\tan(A\sin(\omega t))}{\tan(A)} + \frac{HRES}{2} \quad (2)$$

where A is the maximum scan angle as shown in FIG. 2. Equation (2) is accurate as it accounts for the sinusoidally varying optical scan angle and the tangent function which results from the maximum optical scan angle A. The tan(A) term in the denominator is a normalizing term that doesn't vary once the maximum optical scan angle is determined.

Although equation (2) is accurate, in practice it is somewhat difficult to implement because of the requirement that it be evaluated at the pixel rate, which may be on the order of 100 MHz or higher. In some embodiments, a simplification is applied in which a Taylor series approximation is used as shown in equation (3).

$$x = \frac{HRES}{2\tan(A)}\left[A\sin(\omega t) + \frac{A^3\sin^3(\omega t)}{3}\right] + \frac{HRES}{2} \quad (3)$$

The approximation of equation (3) reduces the horizontal position error as shown in Table 1, below.

TABLE 1

Horizontal Position Error

| Optical Scan Angle | Without Compensation | With Eq. (3) Compensation |
|---|---|---|
| +/−18° | 3.3% | 0.0% |
| +/−24° | 5.9% | 0.4% |
| +/−30° | 9.3% | 1.0% |
| +/−36° | 13.5% | 2.2% |
| +/−42° | 18.6% | 4.4% |

Figure 8:
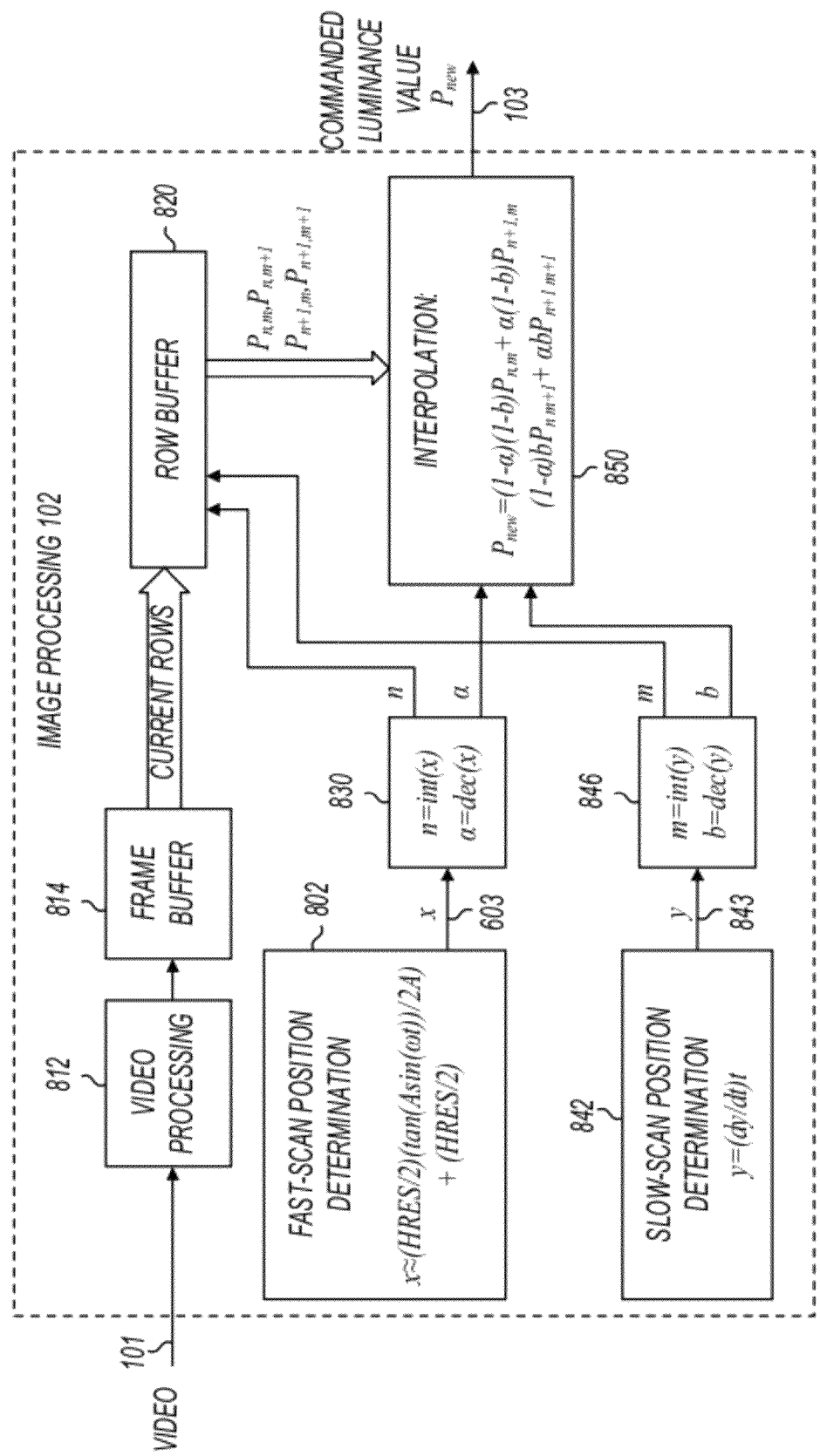
FIG. 8 shows an image processing component in accordance with various embodiments of the present invention.
Figure 10:
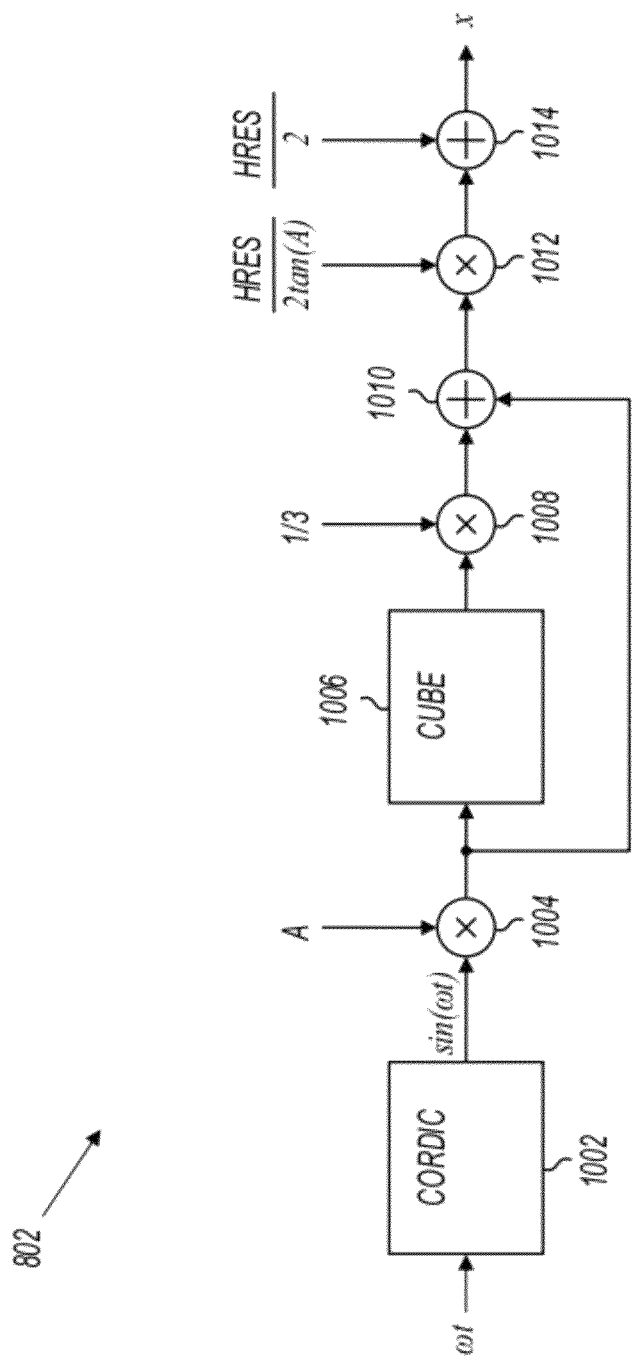
FIG. 10 shows a pixel location determination component in accordance with various embodiments of the present invention.

Various scanning projection apparatus are described further below that implement the fast-scan tangential compensation. For example, FIG. 10 shows hardware suitable to determine the approximation of equation (3), and FIG. 8 shows details of image processing component 102 that interpolates source image pixel data using the approximation of equation (3).

Figure 3:
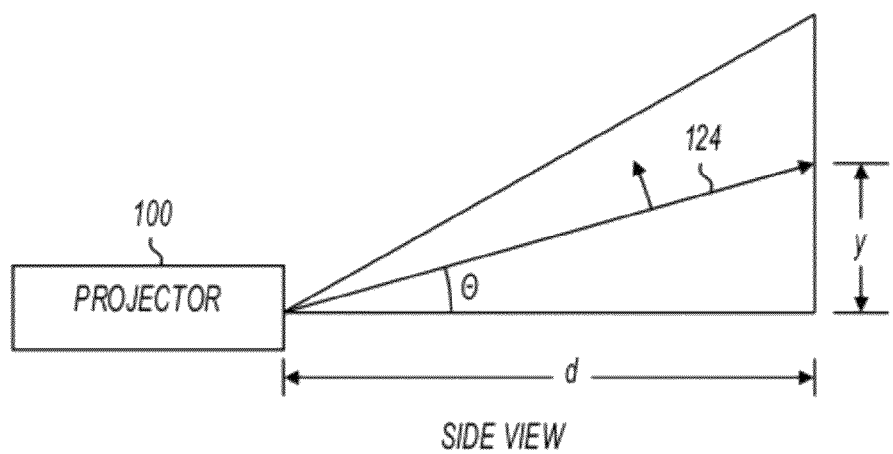
FIG. 3 shows a side view of the scanning projection apparatus with a light beam scanning in a slow-scan dimension.

FIG. 3 shows a side view of the scanning projection apparatus with a light beam scanning in a slow-scan dimension. Scanning projection apparatus 100 is shown sweeping light beam 124 in the vertical slow-scan dimension. When the light beam is at an angle θ, the vertical location is shown as y. As shown in FIG. 3, θ varies from 0° to some maximum angle (e.g., 28°). This allows projection apparatus 100 to sit on a flat surface and project up such that the surface does not interfere with the projected image. In some embodiments, θ varies from a negative angle to a positive angle, and the tangential compensation still applies.

An unmodified vertical scan ramp typically uses a simple relationship between time and scan angle in which the vertical scan angle θ is approximated as a linear function of time as shown in equation (4).

$$\theta(t) = kt \quad (4)$$

The distortion resulting from equation (4) is negligible for small angles but results in significant linearity errors as the optical scan angle increases. Equation (5) shows the desired relationship in which vertical position y, rather than angle θ, is a linear function of time.

$$y(t) = kt \quad (5)$$

As shown in FIG. 3, scanning projection apparatus 100 is a distance d from the projection surface. Accordingly, the relationship between scan angle θ and vertical position y is:

$$y = d\tan(e) \quad (6)$$

Combining equations (5) and (6) yields an equation (7) that shows how to drive angle θ such that vertical position y will vary linearly with time.

$$\theta(t) = \tan^{-1}\left(\frac{y}{d}\right) = \tan^{-1}\left(\frac{kt}{d}\right) \quad (7)$$

Various embodiments of the present invention use equation (7) to construct a vertical drive target waveform for the active video portion of the vertical drive system. The vertical drive system deconstructs the vertical drive target waveform into many Fourier components which are summed and used to drive the scanning mirror. A feedback system monitors the mirror motion and adjusts the amplitude and phase of each Fourier component to achieve mirror motion matching the vertical drive target. Accordingly, the scanning mirror motion obeys the function of equation (7) during active video and the tangential distortion in the slow-scan dimension is eliminated in the displayed image.

Figure 6:
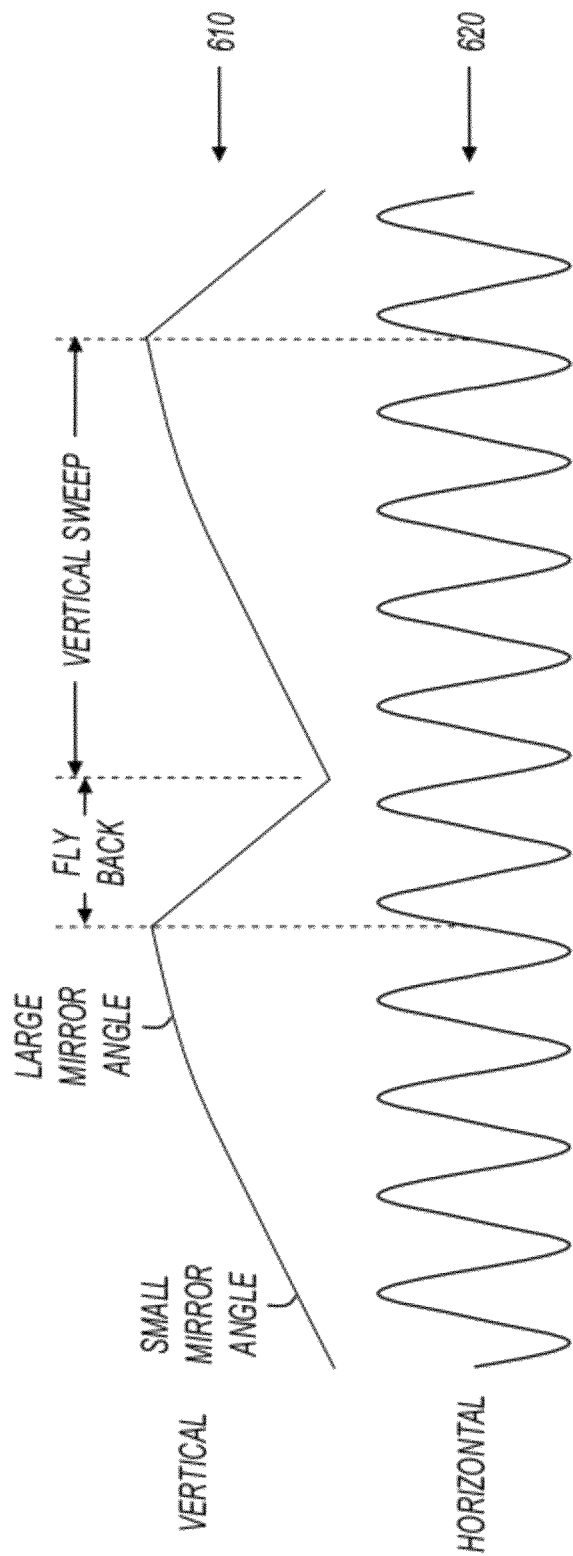
FIG. 6 shows scanning mirror deflection waveforms in accordance with various embodiments of the present invention.
Figure 7:
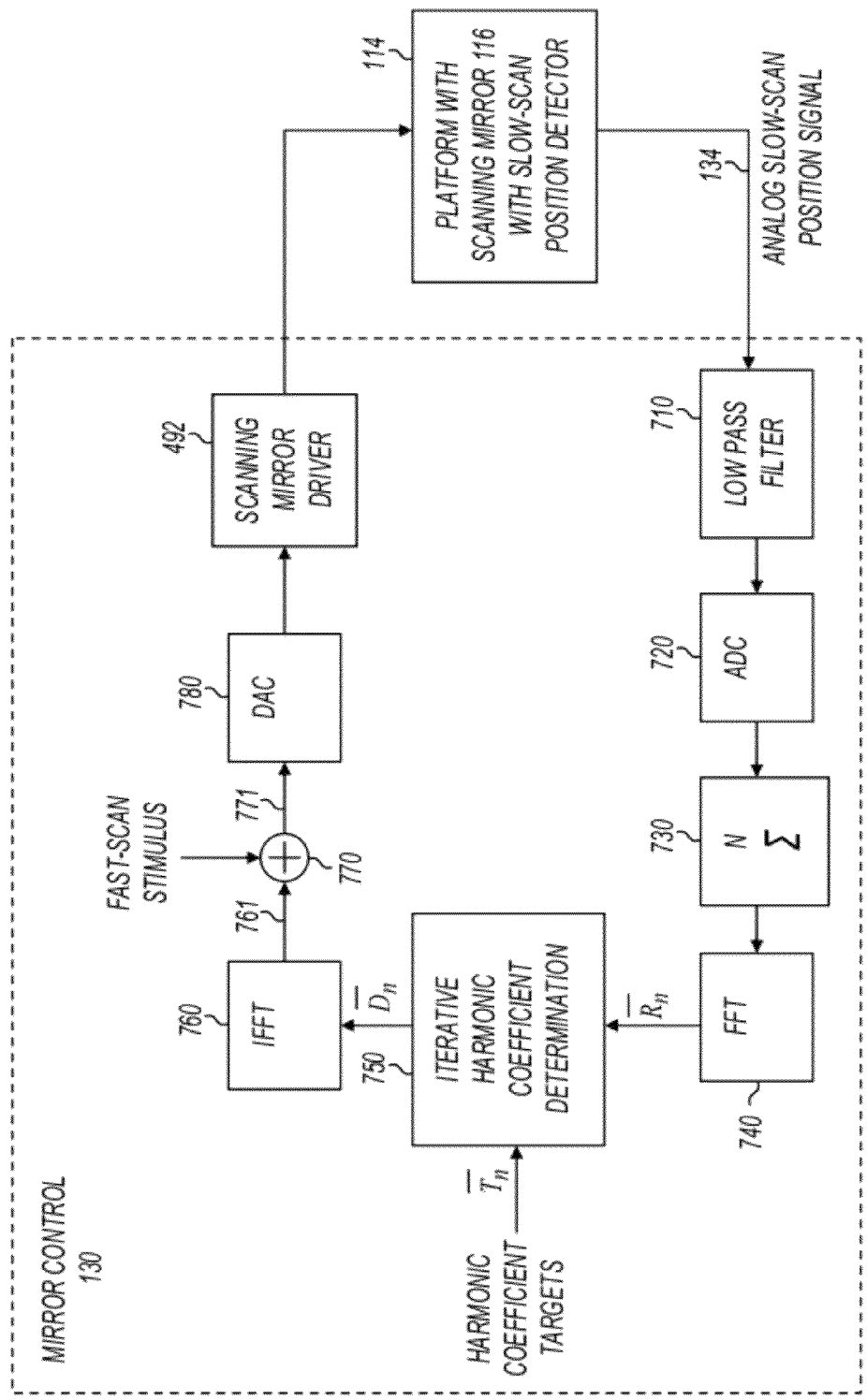
FIG. 7 shows a scanning mirror control circuit in accordance with various embodiments of the present invention.

Various scanning projection apparatus are described further below that implement the slow-scan tangential compensation. For example, FIG. 6 shows a vertical mirror deflection waveform that complies with equation (7), and FIG. 7 shows a scanning mirror control circuit that generates the drive signal for the scanning mirror.

The tangential distortion compensation described above with reference to FIGS. 2 and 3 compensate for tangential distortion in both the fast-scan dimension and slow-scan dimension, but in different ways. The fast-scan tangential nonlinearity is addressed by incorporating the tangent of the angle into the interpolation equation used to retrieve pixels from the frame buffer. In this case, the video data stream is altered rather than the horizontal scan angle drive. The slow-scan tangential nonlinearity is addressed by modifying the drive to the scanning mirror. In this case, the vertical scan angle drive is altered rather than the video data stream.

Figure 4:
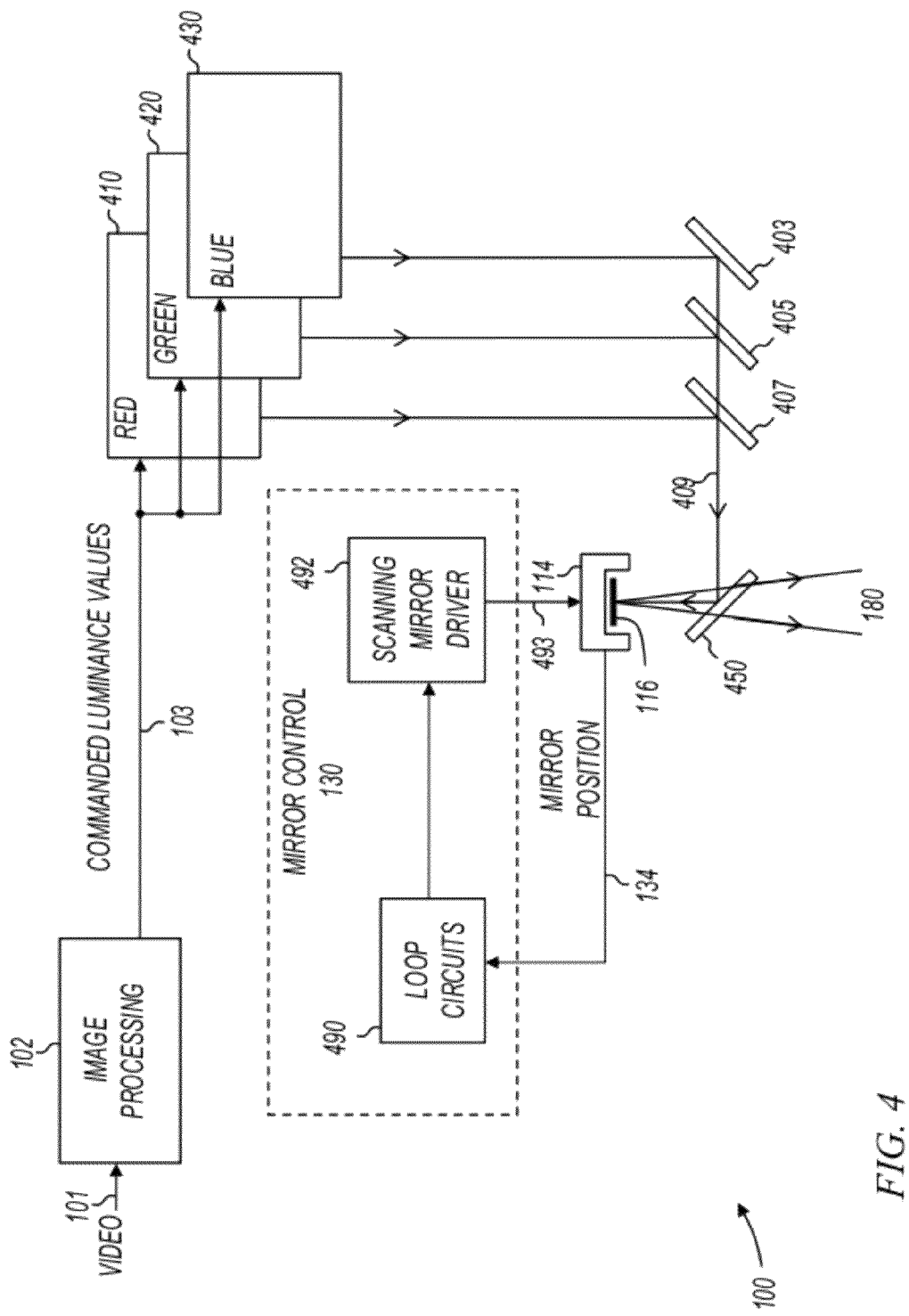
FIG. 4 shows a scanning projection apparatus in accordance with various embodiments of the present invention.

FIG. 4 shows a scanning projection apparatus in accordance with various embodiments of the present invention. Scanning projection apparatus 100 is shown in slightly more detail in FIG. 4 than in FIG. 1. Scanning projection apparatus 100 includes image processing component 102, laser light sources 410, 420, and 430. Projection system 100 also includes mirrors 403, 405, and 407, fold mirror 450, scanning platform 114 having mirror 116, and mirror control circuit 130. Mirror control circuit 130 includes loop circuits 490 and scanning mirror driver 492.

In operation, image processing component 102 receives video data on node 101, and produces commanded luminance values to drive the laser light sources when pixels are to be displayed. Image processing component 102 may include any suitable hardware and/or software useful to produce commanded drive values from video data. For example, image processing component 102 may include application specific integrated circuits (ASICs), one or more processors, or the like. In some embodiments, image processing component 102 determines the horizontal beam location x in accordance with equation (3), and interpolates between pixels received in the video stream to compensate for tangential distortion in the fast scan dimension. An example of image processing component 102 is described more fully below with reference to FIG. 8.

Laser light sources 410, 420, and 430 receive commanded drive values and produce light. Each light source produces a narrow beam of light which is directed to the scanning mirror via guiding optics. For example, blue laser light source 430 produces blue light which is reflected off mirror 403 and is passed through mirrors 405 and 407; green laser light source 420 produces green light which is reflected off mirror 405 and is passed through mirror 407; and red laser light source 410 produces red light which is reflected off mirror 407. At 409, the red, green, and blue light are combined. The combined laser light is reflected off mirror 450 on its way to scanning mirror 116. The scanning mirror rotates on two axes in response to electrical stimuli received on node 493 from scanning mirror driver 492. After reflecting off scanning mirror 116, the laser light bypasses mirror 450 to create an image at 180.

Loop circuits 490 receive the mirror position information at 134, and determine the appropriate drive signals to be driven by scanning mirror driver 492 in order to compensate for tangential distortion in the slow-scan dimension. An example of mirror control component 130 is described more fully below with reference to FIG. 7.

Figure 5:
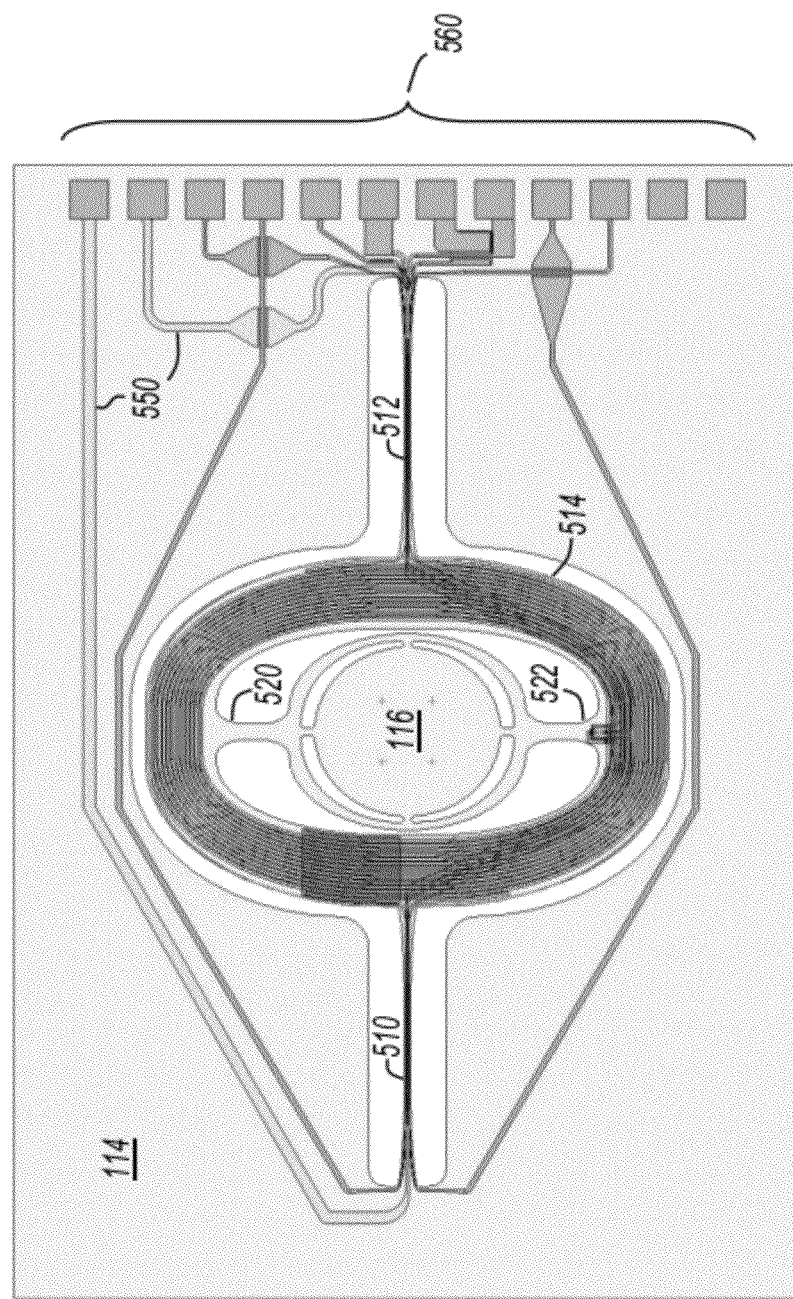
FIG. 5 shows a plan view of a microelectromechanical system (MEMS) device with a scanning mirror.

FIG. 5 shows a plan view of a microelectromechanical system (MEMS) device 500 with a scanning platform and a scanning mirror. Scanning platform 114 includes gimbal 514 and scanning mirror 116. Gimbal 514 is coupled to scanning platform 114 by flexures 510 and 512, and scanning mirror 116 is coupled to gimbal 514 by flexures 520 and 522. Gimbal 514 has a drive coil connected to drive lines 550. Current driven into drive lines 550 produces a current in the drive coil. Scanning platform 114 also incorporates one or more integrated piezoresistive position sensors. In some embodiments, scanning platform 114 includes one position sensor for each axis. Two of the interconnects 560 are coupled to drive lines 550. The remaining interconnects provide for the integrated position sensors for each axis.

In operation, an external magnetic field source (not shown) imposes a magnetic field on the drive coil. The magnetic field imposed on the drive coil by the external magnetic field source has a component in the plane of the coil, and is oriented at roughly 45° with respect to the two drive axes. The in-plane current in the coil windings interacts with the in-plane magnetic field to produce out-of-plane Lorentz forces on the conductors. Since the drive current forms a loop on gimbal 514, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The frequency components of the applied torque are selected to excite the horizontal mirror resonance (~18 kHz) and to provide a ramp drive for the vertical mirror motion (60 Hz, 120 Hz, 180 Hz . . . ). The frequency response characteristics of mirror 116 and gimbal 514 act to separate the torque components into their respective motions. In some embodiments of the present invention, tangential distortion in the slow-scan dimension is compensated by controlling the amplitude and phase of the ramp drive frequency components (e.g. at 60 Hz, 120 Hz, 180 Hz . . . ).

The scanning mirror shown in FIG. 5 is an example of a "coil driven mirror", and more specifically, a "moving coil" design, because the coil moves in the presence of a magnetic field. In other embodiments, the mirror has one or more fixed magnets attached thereto, and the coil is stationary. In still further embodiments, other types of drive mechanisms are utilized (e.g., capacitively driven MEMS mirrors). The type of drive mechanism used to cause mirror motion is not a limitation of the present invention.

FIG. 6 shows scanning mirror deflection waveforms in accordance with various embodiments of the present invention. Vertical deflection waveform 610 is a sawtooth waveform, and horizontal deflection waveform 620 is a sinusoidal waveform. The sawtooth vertical deflection waveform 610 includes a rising portion corresponding to the sweep of raster scan 126 from bottom-to-top, and also includes a falling portion corresponding to the flyback from top-to-bottom. After the flyback, the vertical sweep traverses substantially the same path on each trajectory.

It is important to note that the waveforms of FIG. 6 represent the desired mirror deflection as opposed to the drive signals provided to the scanning mirror. If the scanning mirror had a perfectly flat natural response with no resonance, scanning mirror control circuit 130 could drive signals 610 and 620 as shown. In actual implementations, scanning mirror 116 has resonant characteristics with multiple distinct vibration modes. Scanning mirror control circuit 130 modifies the drive signals in an attempt to cause the scanning mirror 116 to deflect according to the waveforms shown in FIG. 6 and thereby sweep controlled beam 124 to generate raster scan 126.

As shown in FIG. 6, vertical deflection waveform 610 appears substantially linear for small mirror angles, and becomes increasingly nonlinear for large scan angles. This nonlinearity in the mirror angle provides a linear sweep of beam 124 across projection surface 126 in the slow-scan dimension. Vertical deflection waveform 610 corresponds to a sweep in mirror angle from 0° to some positive angle as shown in FIG. 3. In some embodiments, the mirror sweeps from a negative angle, through 0°, to a positive angle. In these embodiments, the nonlinearity in the desired deflection waveform appears at both ends of the scan cycle as opposed to just at one end as shown in FIG. 6.

For ease of illustration, FIGS. 1 and 6 show a relatively small number of fast-scan cycles for each slow-scan cycle. In some embodiments, a significantly larger number of fast-scan cycles exist for each slow-scan cycle. For example, the slow-scan sweep may operate near 60 Hz and the fast-scan sweep may operate upwards of 18 kHz. One skilled in the art will appreciate that the various embodiments of the present invention may be advantageously applied to any scanning system regardless of the relationship between slow and fast-scan frequencies.

FIG. 7 shows a scanning mirror control circuit in accordance with various embodiments of the present invention. FIG. 7 shows a scanning mirror slow-scan control loop that iteratively determines harmonic coefficients to create a slow-scan mirror deflection that compensates for tangential distortion in the slow-scan dimension. Scanning mirror control circuit 130 includes iterative harmonic coefficient determination block 750, inverse fast Fourier transform (IFFT) block 760, summer 770, digital-to-analog converter (DAC) 780, scanning mirror driver 492, scanning platform 114, low pass filter 710, analog-to-digital converter (ADC) 720, summing buffer 730, and fast Fourier transform (FFT) block 740. Scanning platform 114 may be any platform that includes a scanning mirror with slow-scan position detection, including the examples described above with reference to FIG. 5.

In operation, harmonic drive coefficients are provided to IFFT block 760. The harmonic drive coefficients are represented as $$\overline{D}_n = D_R + iD_I, \quad (8)$$

where n is the harmonic number, $\overline{D}_n$ is complex, $D_R$ is real, and $iD_I$ is imaginary. IFFT block 760 performs an inverse fast Fourier transform or the equivalent, producing a time domain digital waveform on node 761 from the harmonic drive coefficients. The time domain digital waveform on node 761 represents the mirror stimulus that will produce slow-scan mirror deflection in accordance with waveform 610 (FIG. 6). The time domain digital waveform on node 761 is summed with the fast-scan stimulus by summer 770 to produce a second time domain digital waveform on node 771. The time domain digital waveform on node 771 represents the mirror stimulus that will produce both the slow-scan deflection and the fast-scan deflection as shown in FIG. 6. The time domain digital waveform on node 771 is converted to an analog signal by DAC 780. The resulting analog drive signal is provided to driver circuit 492 which drives scanning mirror 116 in platform 114.

Scanning mirror 116 includes position detectors in the slow-scan direction. These sensors provide a signal that corresponds to the actual angular displacement of the mirror in the slow-scan direction. The analog slow-scan position signal is provided from the sensors to low pass filter 710. Low pass filter 710 may have any suitable cut-off frequency. For example, the filter cut-off frequency may be on the order of a few kHz to remove any signal energy resulting from the higher frequency vibration modes of the mirror.

The low pass filtered slow-scan position signal is converted to digital form by ADC 720, and summing buffer 730 sums (or averages) the slow-scan position waveform over N cycles to increase the signal-to-noise ration (SNR). The slow-scan position waveform can be averaged over any number of cycles without departing from the scope of the present invention. The averaged slow-scan position waveform is processed by FFT 740 to yield the return harmonic coefficients represented as $$\overline{R}_n = R_R + iR_I, \quad (9)$$

where n is the harmonic number, $\overline{R}_n$ is complex, $R_R$ is the real, and $iR_I$ is imaginary. Iterative harmonic coefficient determination block 750 receives the return harmonic coefficients $\overline{R}_n$ as well as harmonic coefficient targets $\overline{T}_n$. The harmonic coefficient targets are represented as $$\overline{T}_n = T_R + iT_I, \quad (10)$$

where n is the harmonic number, $\overline{T}_n$ is complex, $T_R$ is the real, and $iT_I$ is imaginary. Harmonic coefficient targets $\overline{T}_n$ are the Fourier coefficients that represent the desired slow-scan deflection waveform shown at 610 (FIG. 6).

Iterative harmonic coefficient determination block 750 determines the error in the return coefficients as $$\overline{E}_n = \overline{T}_n - \overline{R}_n, \quad (11)$$

and then updates the harmonic drive coefficients in response to the error. For example, in some embodiments, harmonic coefficient determination block 750 may update the harmonic drive coefficients as $$\overline{D}_n^{k+1} = \overline{D}_n^k + \beta \alpha_n \overline{E}_n^k, \quad (12)$$

where the superscript k in equation (5) refers the $k^{th}$ iteration, the k+1 superscript refers to the next iteration, β is a global gain value (learning rate) in the range of 0 to 1, and alpha, $\alpha_n$, is a static weighting array that provides appropriate magnitude and phase scaling (vector direction) for successive reduction of the error quantity $E_n$.

In some embodiments, the weighting array is the inverse of the mirror gain (transfer function) normalized to one at the primary frequency (60 Hz). One or more mirrors can be characterized, and the weighting array is determined from the measured transfer function. Alternatively, the linear transfer function of the mirror can be measured and learned at device startup or during operation of the device.

At steady state, the harmonic drive coefficients converge to values that cause the slow-scan mirror deflection to equal the deflection shown at 610 (FIG. 6), thereby providing tangential compensation in the slow-scan dimension.

FIG. 8 shows an image processing component in accordance with various embodiments of the present invention. Component 102 includes video processing component 812, frame buffer 814, row buffer 820, and interpolation component 850. Component 102 also includes fast-scan position determination component 802 and slow-scan determination component 842.

In operation, video processing component 812 receives video at 101 and provides frames of image data to frame buffer 814. Rows of pixel data are loaded as needed from frame buffer 814 to row buffer 820, and then pixel intensity data is provided from row buffer 820 to interpolation component 850. Interpolation component 850 then interpolates the pixel intensity data based on the current scanning beam position as provided by components 802 and 842.

Slow-scan position determination component 842 determines and provides the current vertical position y as $$y = \frac{dy}{dt}t, \quad (13)$$

where t is evaluated periodically, and dy/dt is the constant rate of change of y as the beam sweeps across the display surface in the slow-scan direction. The vertical scan position y is broken down into the integer portion m and the decimal portion b at 846. The integer portion is used to retrieve the correct pixel data from row buffer 820, and the decimal portion is used in the interpolation of the pixel intensity data as described further below.

Fast-scan position determination component 802 determines and provides the current horizontal position x as an approximation of equation (2), reproduced here:

$$x = \frac{HRES}{2} \frac{\tan(A\sin(\omega t))}{\tan(A)} + \frac{HRES}{2}. \quad (2)$$

In some embodiments, the approximation of equation (2) is performed by evaluating equation (3), reproduced here:

$$x = \frac{HRES}{2\tan(A)}\left[A\sin(\omega t) + \frac{A^3\sin^3(\omega t)}{3}\right] + \frac{HRES}{2}. \quad (3)$$

The horizontal beam position x is decomposed into the integer portion n and the decimal portion α at 830. The integer portion is used to retrieve the correct pixel data from row buffer 820, and the decimal portion is used in the interpolation of the pixel intensity data.

Row buffer 820 receives n and m and provides pixel intensity data for pixels, $P_{n,m}$, $P_{n,m+1}$, $P_{n+1,m}$, and $P_{n+1,m+1}$ to interpolation component 850. Interpolation component 850 interpolates between $P_{n,m}$, $P_{n,m+1}$, $P_{n+1,m}$, and $P_{n+1,m+1}$ to determine the new pixel intensity $P_{new}$ as $$P_{new}=(1-\alpha)(1-b)P_{n,m}+\alpha(1-b)P_{n+1,m}+(1-\alpha)bP_{n,m+1}+\alpha b P_{n+1,m+1} \quad (14)$$

Equation (14) is an example of linear interpolation between four pixels. The various embodiments of the invention are not limited to linear interpolation. For example, in some embodiments, nearest neighbor interpolation is used, and in other embodiments, higher order (e.g., cubic) interpolation is utilized.

Figure 9:
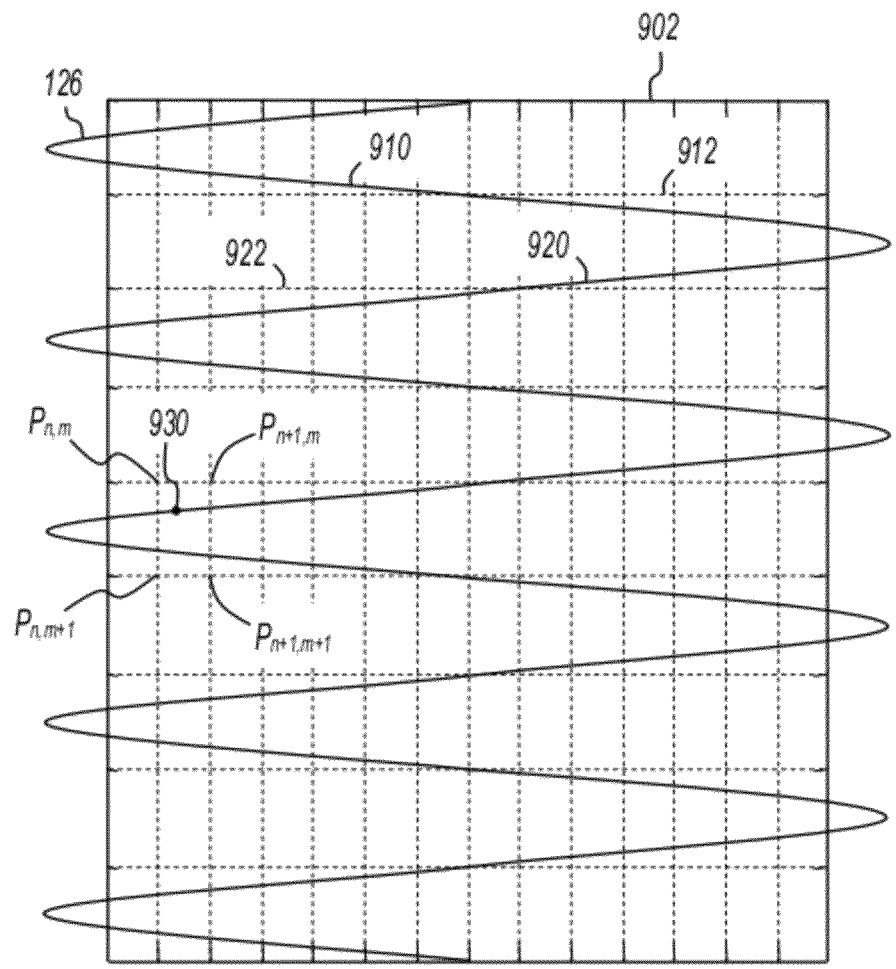
FIG. 9 shows a scan trajectory with interpolated display pixel data.

An example of interpolation between four pixels is shown in FIG. 9. Equation (14) provides interpolation between pixels in different rows and different columns. In operation, row buffer 820 holds as many rows as necessary to accommodate one horizontal sweep. Further, vertical misalignment may be compensated by accessing one or more rows above or below the actual vertical scan position. In some embodiments, vertical color misalignment is compensated in this manner. Prior to each horizontal sweep, row buffer 820 is loaded with multiple rows of pixel data from frame buffer 814.

FIG. 9 shows a scan trajectory with interpolated display pixel data. Scan trajectory 126 is shown superimposed upon a grid 902. Grid 902 represents rows and columns of pixels that make up a display image. The rows of pixels are aligned with the horizontal dashed lines, and columns of pixels are aligned with the vertical dashed lines. The image is made up of pixels that occur at the intersections of dashed lines.

Because scan trajectory 126 does not necessarily intersect each pixel in the source image, pixels to be displayed $P_{new}$ (referred herein as "display pixels") are interpolated from the source image pixels as described above with reference to FIG. 8. For example, a display pixel may occur at point 930 which lies to the right of pixels $P_{n,m}$ and $P_{n,m+1}$, and to the left of pixels $P_{n+1,m}$ and $P_{n+1,m+1}$ in grid 502. To arrive at the pixel value for display pixel 930, the projection apparatus interpolates in accordance with equation (14).

Displayed pixels may outnumber pixels in the grid. For example, because the horizontal sinusoidal trajectory sweeps faster in the center than at either the left or right sides, a linear pixel display rate that displays at least one pixel per column near the horizontal center will display more than one pixel per column near the left and right sides. In some embodiments, the pixel clock and sweep frequencies are timed to display about two pixels per column in the center, and about eight or more pixels per column near the left and right sides. Interpolation between neighboring pixels allows display pixels to "land" anywhere between pixels within the grid while still displaying the correct intensity.

In some embodiments, the vertical sweep rate is set such that the number of horizontal sweeps equals the number of rows in the grid. For example, as shown in FIG. 9, each horizontal sweep 910 from left to right may corresponds to one row 912 and the following sweep from right to left 920 may correspond to the next row 922. In these embodiments, the vertical scan position at any time may be approximated as a corresponding row. This introduces some image distortion where the displayed pixels are clustered near the left and right sides of the image, but also reduces processing complexity. In other embodiments, the vertical sweep rate is independent of, and not related to, the number of rows in the grid.

FIG. 10 shows a fast-scan position determination component in accordance with various embodiments of the present invention. Fast-scan position determination component 802 provides the fast scan position determination shown in FIG. 8 using the approximation of equation (3). CORDIC block 1002 receives the current phase value ωt and produces sin (ωt). CORDIC algorithms to be used for this purpose are well known in the art. Multiplier 1004 multiplies the coefficient A and sin(ωt), and the result is cubed at 1006. The cubed result is multiplied by ⅓ by multiplier 1008 and summed with A sin(ωt) by summer 1010. The output of summer 1010 is multiplied by $$\frac{HRES}{2\tan(A)}$$

at 1012, and the result is summed with $$\frac{HRES}{2}$$

by summer 1014 to produce the horizontal position x.

When the fast-scan position is determined in accordance with the circuits of FIG. 10, the resulting interpolation provides tangential compensation in the fast-scan dimension.

Figure 11:
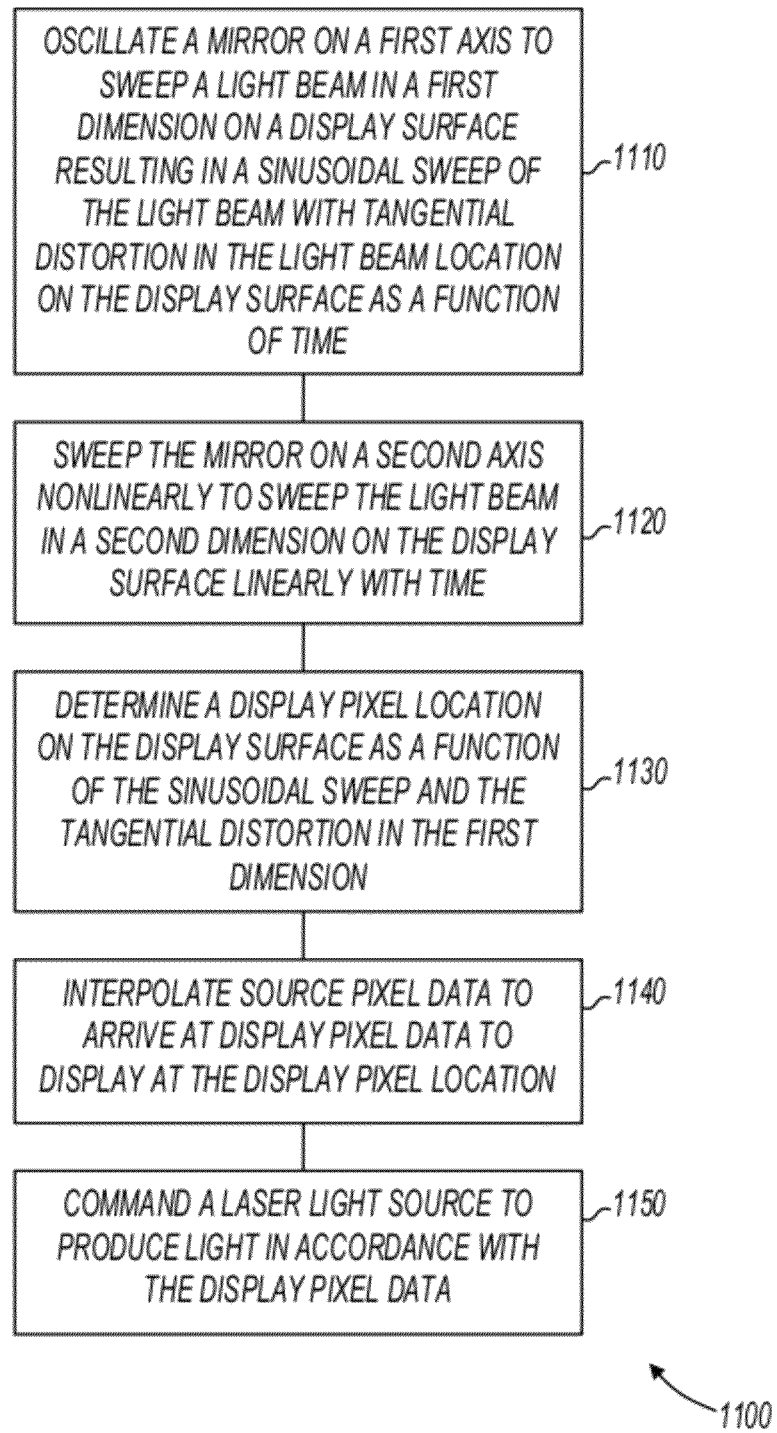
FIG. 11 shows a flow diagram of a method in accordance with various embodiments of the invention.

FIG. 11 shows a flow diagram of methods in accordance with various embodiments of the present invention. In some embodiments, method 1100, or portions thereof, is performed by a scanning projection apparatus, embodiments of which are shown in previous figures. In other embodiments, method 1100 is performed by a series of circuits or an electronic system. Method 1100 is not limited by the particular type of apparatus performing the method. The various actions in method 1100 may be performed in the order presented, or may be performed in a different order. Further, in some embodiments, some actions listed in FIG. 11 are omitted from method 1100.

Method 1100 is shown beginning with block 1110 in which a mirror is oscillated on a first axis to sweep a light beam in a first dimension on a display surface resulting in a sinusoidal sweep of the light beam with tangential distortion in the light beam location on the display surface as a function of time. In some embodiments, this corresponds to mirror 116 (FIG. 5) oscillating about an axis defined by flexures 520 and 522, and sweeping light beam 124 sinusoidally in the horizontal dimension as shown in FIG. 1.

At 1120, the mirror is swept on a second axis nonlinearly to sweep the light beam in a second dimension on the display surface linearly with time. In some embodiments, this corresponds to gimbal 514 sweeping angularly about an axis defined by flexures 510 and 512 according to deflection waveform 610 (FIG. 6) such that the vertical position y changes linearly with time on the display surface.

At 1130, a display pixel location on the display surface is determined as a function of the sinusoidal sweep and the tangential distortion in the first dimension. In some embodiments, this corresponds to fast-scan position determination component determining the horizontal location in accordance with equation (2) or equation (3).

At 1140, source pixel data is interpolated to arrive at display pixel data to display at the display pixel location. In some embodiments, this corresponds to interpolator 850 determining the value of display pixel $P_{new}$ using equation (14).

At 1150, a laser light source is commanded to produce light in accordance with the display pixel data. This corresponds to the commanded luminance being provided to one or more laser light sources such as laser light sources 410, 420, and 430 (FIG. 4).

The tangential distortion compensation described above with reference to FIG. 11 compensates for tangential distortion in both the fast-scan dimension and slow-scan dimension, but in different ways. The fast-scan tangential nonlinearity is addressed by incorporating the tangent of the angle into the interpolation equation used to retrieve pixels from the frame buffer. In this case, the video data stream is altered rather than the horizontal scan angle drive. The slow-scan tangential nonlinearity is addressed by modifying the drive to the scanning mirror. In this case, the vertical scan angle drive is altered rather than the video data stream.

Figure 12:
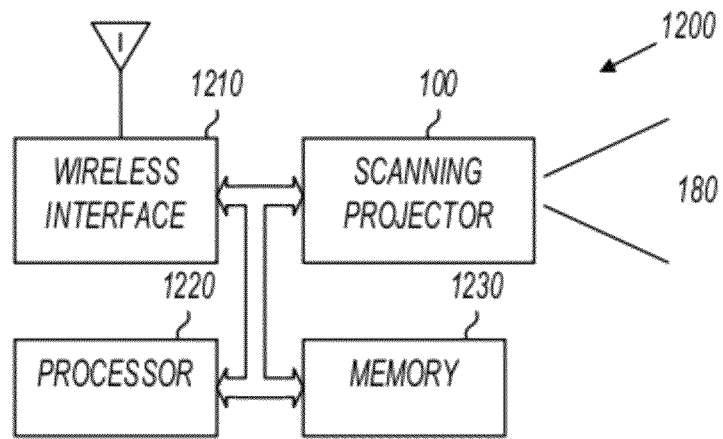
FIG. 12 shows a block diagram of a mobile device in accordance with various embodiments of the present invention.

FIG. 12 shows a block diagram of a mobile device in accordance with various embodiments of the present invention. As shown in FIG. 12, mobile device 1200 includes wireless interface 1210, processor 1220, memory 1230, and scanning projector 100. Scanning projector 100 paints a raster image at 180. Scanning projector 100 is described with reference to previous figures. In some embodiments, scanning projector 100 includes tangential compensation in one or more dimensions such as that shown in, and described with reference to, earlier figures.

Scanning projector 100 may receive image data from any image source. For example, in some embodiments, scanning projector 100 includes memory that holds still images. In other embodiments, scanning projector 100 includes memory that includes video images. In still further embodiments, scanning projector 100 displays imagery received from external sources such as connectors, wireless interface 1210, or the like.

Wireless interface 1210 may include any wireless transmission and/or reception capabilities. For example, in some embodiments, wireless interface 1210 includes a network interface card (NIC) capable of communicating over a wireless network. Also for example, in some embodiments, wireless interface 1210 may include cellular telephone capabilities. In still further embodiments, wireless interface 1210 may include a global positioning system (GPS) receiver. One skilled in the art will understand that wireless interface 1210 may include any type of wireless communications capability without departing from the scope of the present invention.

Processor 1220 may be any type of processor capable of communicating with the various components in mobile device 1200. For example, processor 1220 may be an embedded processor available from application specific integrated circuit (ASIC) vendors, or may be a commercially available microprocessor. In some embodiments, processor 1220 provides image or video data to scanning projector 100. The image or video data may be retrieved from wireless interface 1210 or may be derived from data retrieved from wireless interface 1210. For example, through processor 1220, scanning projector 100 may display images or video received directly from wireless interface 1210. Also for example, processor 1220 may provide overlays to add to images and/or video received from wireless interface 1210, or may alter stored imagery based on data received from wireless interface 1210 (e.g., modifying a map display in GPS embodiments in which wireless interface 1210 provides location coordinates).

Figure 13:
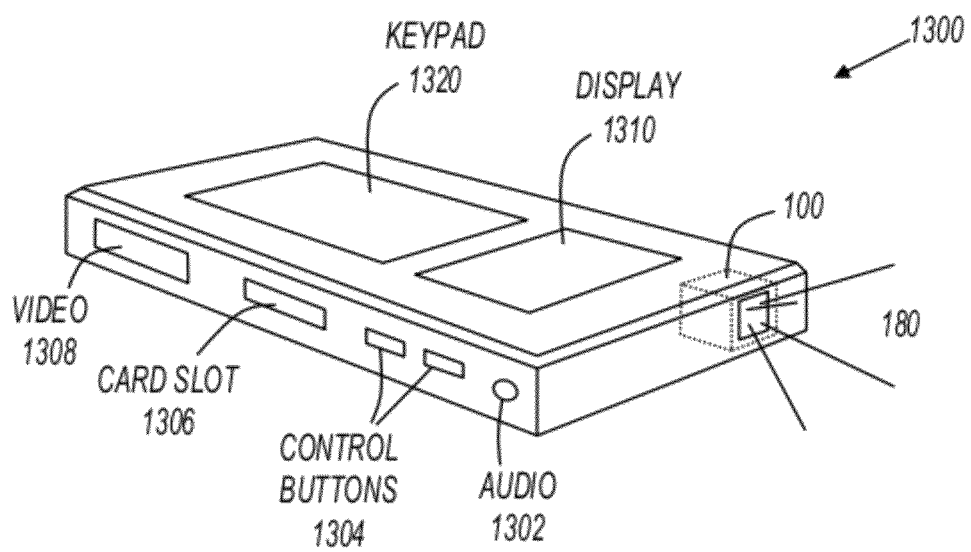
FIG. 13 shows a mobile device in accordance with various embodiments of the present invention.

FIG. 13 shows a mobile device in accordance with various embodiments of the present invention. Mobile device 1300 may be a hand held projection device with or without communications ability. For example, in some embodiments, mobile device 1300 may be a handheld projector with little or no other capabilities. Also for example, in some embodiments, mobile device 1300 may be a device usable for communications, including for example, a cellular phone, a smart phone, a personal digital assistant (PDA), a global positioning system (GPS) receiver, or the like. Further, mobile device 1300 may be connected to a larger network via a wireless (e.g., WiMax) or cellular connection, or this device can accept data messages or video content via an unregulated spectrum (e.g., WiFi) connection.

Mobile device 1300 includes scanning projector 100 to create an image with light at 180. Mobile device 1300 also includes many other types of circuitry; however, they are intentionally omitted from FIG. 13 for clarity.

Mobile device 1300 includes display 1310, keypad 1320, audio port 1302, control buttons 1304, card slot 1306, and audio/video (A/V) port 1308. None of these elements are essential. For example, mobile device 1300 may only include scanning projector 100 without any of display 1310, keypad 1320, audio port 1302, control buttons 1304, card slot 1306, or A/V port 1308. Some embodiments include a subset of these elements. For example, an accessory projector product may include scanning projector 100, control buttons 1304 and A/V port 1308.

Display 1310 may be any type of display. For example, in some embodiments, display 1310 includes a liquid crystal display (LCD) screen. Display 1310 may always display the same content projected at 180 or different content. For example, an accessory projector product may always display the same content, whereas a mobile phone embodiment may project one type of content at 180 while display different content on display 1310. Keypad 1320 may be a phone keypad or any other type of keypad.

A/V port 1308 accepts and/or transmits video and/or audio signals. For example, A/V port 1308 may be a digital port that accepts a cable suitable to carry digital audio and video data. Further, A/V port 1308 may include RCA jacks to accept composite inputs. Still further, A/V port 1308 may include a VGA connector to accept analog video signals. In some embodiments, mobile device 1300 may be tethered to an external signal source through A/V port 1308, and mobile device 1300 may project content accepted through A/V port 1308. In other embodiments, mobile device 1300 may be an originator of content, and A/V port 1308 is used to transmit content to a different device.

Audio port 1302 provides audio signals. For example, in some embodiments, mobile device 1300 is a media player that can store and play audio and video. In these embodiments, the video may be projected at 180 and the audio may be output at audio port 1302. In other embodiments, mobile device 1300 may be an accessory projector that receives audio and video at A/V port 1308. In these embodiments, mobile device 1300 may project the video content at 180, and output the audio content at audio port 1302.

Mobile device 1300 also includes card slot 1306. In some embodiments, a memory card inserted in card slot 1306 may provide a source for audio to be output at audio port 1302 and/or video data to be projected at 180. Card slot 1306 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 14:
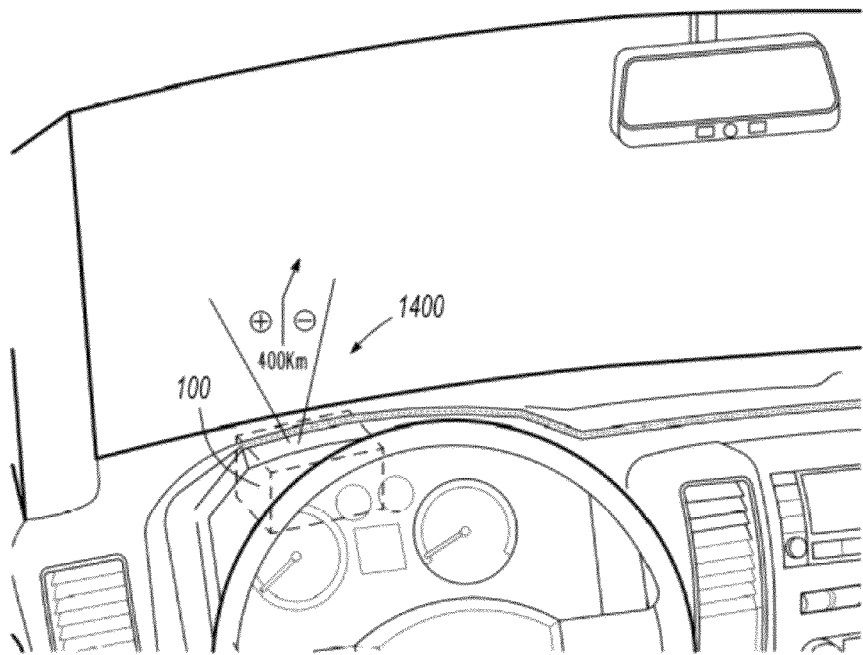
FIG. 14 shows a head-up display system in accordance with various embodiments of the invention.

FIG. 14 shows a head-up display system in accordance with various embodiments of the invention. Projector 100 is shown mounted in a vehicle dash to project the head-up display at 1400. Although an automotive head-up display is shown in FIG. 14, this is not a limitation of the present invention. For example, various embodiments of the invention include head-up displays in avionics application, air traffic control applications, and other applications.

Figure 15:
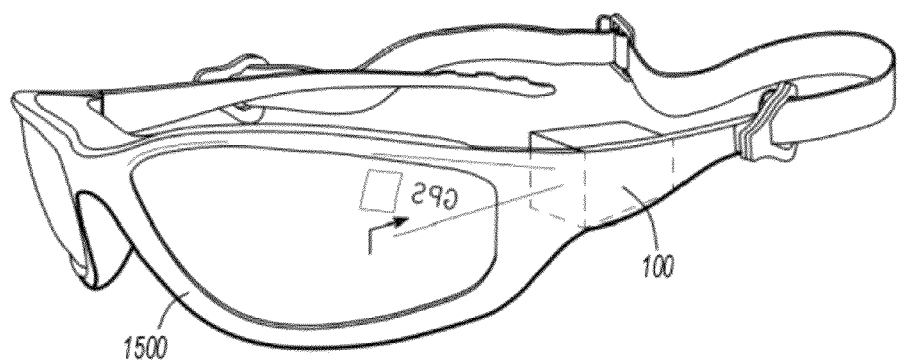
FIG. 15 shows eyewear in accordance with various embodiments of the invention.

FIG. 15 shows eyewear in accordance with various embodiments of the invention. Eyewear 1500 includes projector 100 to project a display in the eyewear's field of view. In some embodiments, eyewear 1500 is see-through and in other embodiments, eyewear 1500 is opaque. For example, eyewear may be used in an augmented reality application in which a wearer can see the display from projector 100 overlaid on the physical world. Also for example, eyewear may be used in a virtual reality application, in which a wearer's entire view is generated by projector 100. Although only one projector 100 is shown in FIG. 15, this is not a limitation of the present invention. For example, in some embodiments, eyewear 1500 includes two projectors; one for each eye.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
a laser light source;
a mirror being oscillatable on a first axis, the mirror being positioned to reflect light from the laser light source and sweep a light beam sinusoidally through an angle and across a display surface in a first dimension, resulting in tangential distortion in the light beam location on the display surface as a function of time; and
a beam position determination component that determines a location of the light beam on the display surface, wherein the beam position determination component determines the beam location as a function of the sinusoidal sweep as well as the tangential distortion, and wherein the beam position determination component determines the pixel location as:

$$x = \frac{HRES}{2} \frac{\tan(A\sin(\omega t))}{\tan(A)} + \frac{HRES}{2}.$$

2. An apparatus comprising:
a laser light source;
a mirror being oscillatable on a first axis, the mirror being positioned to reflect light from the laser light source and sweep a light beam sinusoidally through an angle and across a display surface in a first dimension, resulting in tangential distortion in the light beam location on the display surface as a function of time; and
a beam position determination component that determines a location of the light beam on the display surface, wherein the beam position determination component determines the beam location as a function of the sinusoidal sweep as well as the tangential distortion, and wherein the pixel location determination component determines the pixel location as an approximation of:

$$x = \frac{HRES}{2} \frac{\tan(A\sin(\omega t))}{\tan(A)} + \frac{HRES}{2}.$$

3. The apparatus of claim 2 wherein the pixel location determination component determines the pixel location as a Taylor series approximation.

4. An apparatus comprising:
a laser light source;
a mirror being movable on two axes, the mirror being positioned to reflect light from the laser light source and onto a display surface, to sweep a light beam sinusoidally in a first dimension responsive to mirror movement on a first axis of the two axes, and to sweep the light beam nonsinusoidally in a second dimension responsive to movement on a second axis of the two axes;
a control loop responsive to a position of the mirror on the second axis, the control loop including a feedback circuit to determine harmonic coefficients to drive mirror movement on the second axis to sweep the light beam linearly with time across the display surface in the second dimension; and
a light beam position determination component that determines a location of the light beam in the first dimension on the display surface, wherein the light beam position determination component determines the beam location as a function of the sinusoidal sweep as well as a tangential error resulting from the sinusoidally swept light beam illuminating a flat surface, and wherein the light beam position determination component determines the location of the light beam in the first dimension as:

$$x = \frac{HRES}{2}\frac{\tan(A\sin(\omega t))}{\tan(A)} + \frac{HRES}{2}.$$

5. An apparatus comprising:
a laser light source;
a mirror being movable on two axes, the mirror being positioned to reflect light from the laser light source and onto a display surface, to sweep a light beam sinusoidally in a first dimension responsive to mirror movement on a first axis of the two axes, and to sweep the light beam nonsinusoidally in a second dimension responsive to movement on a second axis of the two axes;
a control loop responsive to a position of the mirror on the second axis, the control loop including a feedback circuit to determine harmonic coefficients to drive mirror movement on the second axis to sweep the light beam linearly with time across the display surface in the second dimension; and
a light beam position determination component that determines a location of the light beam in the first dimension on the display surface, wherein the light beam position determination component determines the beam location as a function of the sinusoidal sweep as well as a tangential error resulting from the sinusoidally swept light beam illuminating a flat surface, and wherein the light beam position determination component determines the location of the light beam in the first dimension as:

$$x = \frac{HRES}{2\tan(A)}\left[A\sin(\omega t) + \frac{A^3\sin^3(\omega t)}{3}\right] + \frac{HRES}{2}.$$

6. A method comprising:
oscillating a mirror on a first axis to sweep a light beam in a first dimension on a display surface resulting in a sinusoidal sweep of the light beam with tangential distortion in the light beam location on the display surface as a function of time;
determining a display pixel location on the display surface as a function of the sinusoidal sweep and the tangential distortion in the first dimension;
interpolating source pixel data to arrive at display pixel data to display at the display pixel location; and
commanding a laser light source to produce light in accordance with the display pixel data, wherein determining a display pixel location is an approximation of:

$$x = \frac{HRES}{2}\frac{\tan(A\sin(\omega t))}{\tan(A)} + \frac{HRES}{2}.$$

* * * * *